Aug. 22, 1950 J. A. ENGEL, JR Re. 23,256

CUSHIONED PENCIL POINT

Original Filed May 28, 1946

Inventor

JOHN A. ENGEL, JR.

By Howard J. Whelan.

Attorney

Reissued Aug. 22, 1950

Re. 23,256

UNITED STATES PATENT OFFICE 23,256

CUSHIONED PENCIL POINT

John A. Engel, Jr., Baltimore, Md.

Original No. 2,488,179, dated November 15, 1949, Serial No. 672,799, May 28, 1946. Application for reissue December 20, 1949, Serial No. 134,063

2 Claims. (Cl. 120—9)

Matter enclosed in heavy brackets [ ] appears in the original patent but forms no part of this reissue specification; matter printed in italics indicates the additions made by reissue

This invention relates to writing equipment and more particularly to those of the loading or fountain pen or pencil type.

In the conventional types of fountain pencil, the filler lead is held so rigidly that an abnormal pressure on the point being used in writing causes it to break and interrupt its use. Thus, a person having a heavy manner of writing will continuously break the leads, and, incidentally, become so mentally disturbed as to make errors, causing loss of time; increasing the cost of writing; and probably damaging the writing paper and the composition to be included in the writing. Likewise, in fountain pens, a heavy pressure in writing is apt to seriously injure them.

It is an object of this invention to provide a new and improved form of loading or fountain pencil or pen that will avoid one or more of the disadvantages and limitations of the prior art.

An additional object of the present invention is to provide a new and improved form of loading a fountain pencil or pen that will have a structure resilient enough to enable its user to write at normal pressures, and at abnormal pressures to anticipate the tendency to increase the stresses on the lead or pen point by distributing the force on to the resilient portion of the structure sufficiently to relieve the lead or pen from a load adequate to break it but not enough to prevent it from writing at the instant.

For a clearer understanding of the invention and other objects thereof reference is made to the appended drawings and the following description wherein a particular form of the invention is outlined by way of example, while the scope and spirit of the invention is emphasized in the claims.

In the construction shown in the drawings.

Similar reference characters refer to similar parts throughout the drawings.

Figure 3:
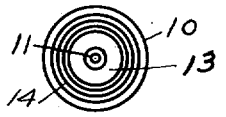
Figure 3 is an end view of Figure 1.
Figure 1:
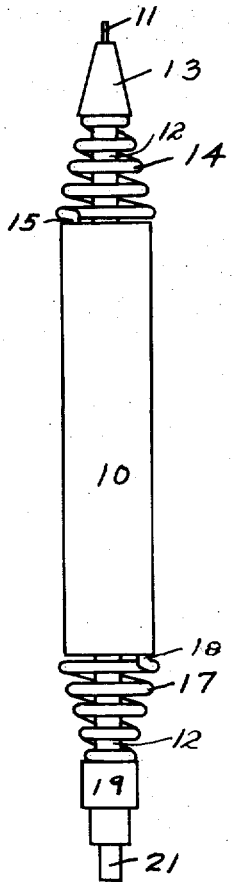
Figure 1 is a side elevation partly in section of a fountain pencil embodying this invention.
Figure 2:
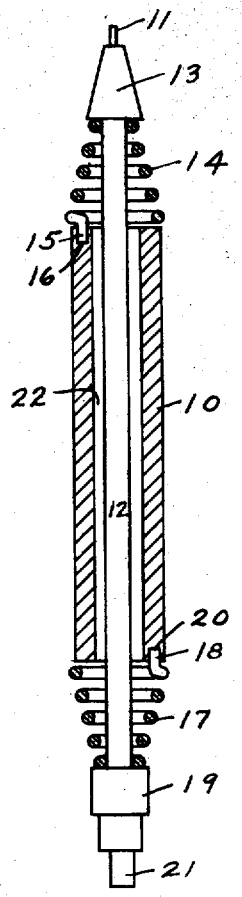
Figure 2 is a sectional view along the line 2—2 of Figure 1.

In this particular structure, a loading pencil is indicated having a hollow cylindrical barrel 10 of conventional contour through which a filler pencil lead 11, in a feeding tube 12, can pass freely and adjust itself to slight variations in lateral displacement. The feeding tube 12 has a conventional muzzle 13 which holds the projecting point portion of the lead 11 in a rigid and adjustable manner. A helical spring 14 of tapered form suspends the tube and muzzle through barrel 10 under tension at the writing end of the pencil structure, or writing implement or element. This coiled spring 14 allows a lateral swing and compressive reciprocation in the movement of the tube and muzzle. The lead 11 being held inside this tube and muzzle moves with them. The spring is preferably held to the barrel in a slot 15 effectively and at the same time provides an aesthetic appearance. The tapering of the spring is directed towards the point and rests against the muzzle where it is held. The tube 12 is somewhat similarly suspended at the butt end of the pencil by another tapered extensible helical spring 17 held to the barrel in a slot 18 at one end, and against lead feeder propelling cap 19 combined and mounted in a conventional way on the feeding tube 12. The cap is suitably arranged to hold the outer end portion of the spring 17. This spring is attached to the barrel 10 at 20 and permits lateral and reciprocating positioning of the tube and cap 19 thereon. An eraser 21 may be included in the cap 19.

The pencil is held by the hand of the user in the usual manner, with the pencil point impressed under pressure on the paper to be written on. The pressure varies as the pencil point is moved in various directions. An increase in pressure resiliently compresses the spring 14 and allows the tube 12 to move rearwardly in the barrel 10. The spring 17 at the same time is resiliently extended by the tube and the cap 19 fastened thereto. The interior passage 22 inside the barrel being appreciably larger in diameter than the tube 12, permits an angular displacement in respect to the axis, so that the pressure in a lateral direction on the pencil point is resiliently compensated for and the greater stress exerted thereon absorbed by the springs.

Since the tendency of manufacturers has been to provide a thin pencil lead in recent years for use in these types of pencils, the provision of a structure facilitating the absorption of any abnormal force produced by the hand of the user, to [present] *prevent* a breaking stress, is highly valuable and important. This invention provides for this and at the same time avoids the use of a complicated or expensive construction, or one that involves weight that is abnormal. At the same time, the pencil may be operated in a conventional manner.

Likewise, a pen structure could be used in place of a filler lead and the suspension of the writing implement made similarly at the end of the barrel and given ample space within the barrel to move about in. The pen structure would sustain the stresses incurred by writing on the pen, in the same respect as the pencil hereinbefore described. The result would be similarly effective in protecting the pen nib.

While there has been described what is at present considered to be a new and improved embodiment of this invention, it will be noted that various changes and modifications may be made thereon without departing from the principles and spirit of the invention, as sought to be defined in the following claims.

I claim:

1. A pencil comprising a sleeve having a central longitudinal passage therethrough, a lead holding tube terminating in a muzzle at one end through which the lead extends and in a cap at the opposite end, said tube extending within the passage in the sleeve and being spaced from said passage all along its length, said tube also protruding at both ends beyond the terminal confines of said sleeve, and a pair of springs mounted coaxially about each of the portions of said tube extending beyond said sleeve, said springs having one end anchored in said sleeve and the opposite end resting, respectively, against said muzzle and said tube, whereby to provide a universal mounting for said tube.

2. *A writing instrument comprising a sleeve having a central longitudinal passage therethrough, a writing material holding tube terminating in a writing means at one end, said tube extending within the passage in the sleeve and being spaced from said passage in the sleeve all along its length, said tube also protruding at both ends beyond the terminal confines of said sleeve, and resilient means mounted coaxially about each of the portions of said tube extending beyond the terminal confines of said sleeve, said resilient means engaging said sleeve and tube.*

JOHN A. ENGEL, JR.

REFERENCES CITED

The following references are of record in the file of this patent or the original patent:

UNITED STATES PATENTS

| Number | Name | Date |
|---|---|---|
| 1,495,287 | Wilson | May 27, 1924 |
| 2,108,442 | Phillips | Feb. 15, 1938 |
| 2,362,582 | Pearson | Nov. 14, 1944 |

FOREIGN PATENTS

| Number | Country | Date |
|---|---|---|
| 178,251 | Switzerland | Feb. 17, 1936 |
| 681,803 | Germany | Oct. 2, 1939 |